(12) United States Patent
Auer et al.

(10) Patent No.: US 10,994,705 B2
(45) Date of Patent: May 4, 2021

(54) VEHICLE WASHING INSTALLATION AND METHOD FOR THE OPERATION THEREOF

(71) Applicant: WashTec Holding GmbH, Augsburg (DE)

(72) Inventors: Robert Auer, Stadtbergen (DE); Christoph Hobmeier, Augsburg (DE); David Stecher, Monheim (DE)

(73) Assignee: WashTec Holding GmbH, Augsburg (DE)

( * ) Notice: Subject to any disclaimer, the term of this patent is extended or adjusted under 35 U.S.C. 154(b) by 513 days.

(21) Appl. No.: 15/507,348

(22) PCT Filed: Aug. 14, 2015

(86) PCT No.: PCT/EP2015/068789
§ 371 (c)(1),
(2) Date: Feb. 28, 2017

(87) PCT Pub. No.: WO2016/030218
PCT Pub. Date: Mar. 3, 2016

(65) Prior Publication Data
US 2017/0297538 A1 Oct. 19, 2017

(30) Foreign Application Priority Data

Aug. 28, 2014 (DE) .................... 10 2014 112 388.3

(51) Int. Cl.
*B60S 3/00* (2006.01)
*B60S 3/06* (2006.01)
(Continued)

(52) U.S. Cl.
CPC .............. *B60S 3/004* (2013.01); *B08B 1/002* (2013.01); *B08B 1/04* (2013.01); *B60S 3/063* (2013.01)

(58) Field of Classification Search
CPC . B08B 1/002; B08B 1/04; B60S 3/004; B60S 3/063
(Continued)

(56) References Cited

U.S. PATENT DOCUMENTS 3,601,833 A * 8/1971 Takeuchi ................ B60S 3/063
15/53.2
3,633,231 A * 1/1972 Capra ..................... B60S 3/063
34/666

(Continued)

FOREIGN PATENT DOCUMENTS

DE 1936889 A1 1/1971
DE 2349861 A1 4/1975
(Continued)

OTHER PUBLICATIONS

Communication to European Patent Office dated Oct. 2, 2017 regarding EP Patent Application No. 15750070.3-1757 with machine translation.

(Continued)

*Primary Examiner* — Nadine G Norton
*Assistant Examiner* — Christopher Remavege
(74) *Attorney, Agent, or Firm* — Paul D. Bianco; Gary S. Winer; Fleit Intellectual Property Law

(57) ABSTRACT

A vehicle washing installation includes at least one side washing brush which is mounted on a crossbar of the vehicle washing installation by a suspension to be rotatable about first and second pivot axes. The suspension has a first actuator for pivoting the side washing brush about the first pivot axis. The problem of providing a vehicle washing installation which, with little constructional outlay, permits a good washing result even in the case of inclined side surfaces and rear surfaces of the vehicle and the inclined transitions between said surfaces is addressed in that the (Continued)

suspension has a second actuator for pivoting the side washing brush about the second pivot axis, and by a method with the steps of: detecting and/or determining the inclination of a first vehicle surface running transversely with respect to the longitudinal direction; pivoting the side washing brush from a basic position about the second pivot axis in a manner corresponding to the inclination of the first vehicle surface; and moving the side washing brush along the first vehicle surface.

19 Claims, 3 Drawing Sheets

(51) Int. Cl.
    *B08B 1/00*         (2006.01)
    *B08B 1/04*         (2006.01)

(58) Field of Classification Search
    USPC ........ 134/123, 181, 57 R, 18, 45, 56 R, 113,
                       134/98, 42; 15/319, 302, 53.2, 53.3,
                       15/306.1, 380, 383, 53.1, 88.3
    See application file for complete search history.

(56) References Cited

U.S. PATENT DOCUMENTS

| | | | | |
|---|---|---|---|---|
| 3,793,667 A * | 2/1974 | Capra | ........................ | B60S 3/06 15/53.2 |
| 3,867,735 A * | 2/1975 | Takeuchi | ................ | B60S 3/063 15/53.3 |
| 3,942,207 A * | 3/1976 | Weigele | .................. | B60S 3/063 15/53.3 |
| 4,225,995 A * | 10/1980 | Ennis | ....................... | B60S 3/063 15/53.3 |
| 5,367,736 A * | 11/1994 | Kaady | ..................... | B60S 3/063 15/53.3 |
| 5,715,558 A | 2/1998 | Johnson | | |
| 5,813,077 A * | 9/1998 | Belanger | .................. | B60S 3/063 15/53.2 |
| 5,930,859 A * | 8/1999 | Ennis | ....................... | B60S 3/063 15/53.3 |
| 5,979,002 A * | 11/1999 | Anderson | ................ | B60S 3/063 15/53.2 |
| 6,835,140 B2 * | 12/2004 | Fazio | ....................... | B60S 3/063 464/134 |
| 7,293,315 B2 * | 11/2007 | Ennis | ....................... | B60S 3/063 15/53.2 |
| 8,099,816 B2 * | 1/2012 | MacNeil | ................... | B60S 3/06 15/53.2 |
| 8,353,073 B2 | 1/2013 | Noffsinger et al. | | |
| 8,726,442 B2 * | 5/2014 | Heid | ....................... | B60S 3/063 15/53.2 |
| 9,845,080 B2 * | 12/2017 | Belanger | .................. | B60S 3/063 |
| 2003/0051302 A1 * | 3/2003 | Fazio | ....................... | B60S 3/04 15/53.2 |
| 2010/0199446 A1 * | 8/2010 | Noffsinger | .............. | B60S 3/063 15/53.3 |

FOREIGN PATENT DOCUMENTS

| | | |
|---|---|---|
| DE | 261 486 A3 | 11/1988 |
| DE | 4334132 A1 | 4/1995 |
| DE | 19524748 A1 | 1/1997 |
| DE | 19620684 A1 | 11/1997 |
| DE | 29814758 U1 | 12/1999 |
| DE | 10 2007 056 701 B3 | 6/2009 |
| DE | 10 2010 011 953 A1 | 9/2011 |
| EP | 0808753 A1 | 11/1997 |
| EP | 0980802 A2 | 2/2000 |
| JP | H01164654 A | 6/1989 |
| JP | H0379455 A | 4/1991 |
| JP | H05213163 A | 8/1993 |
| JP | H6-6136 U | 1/1994 |
| JP | H08332921 A | 12/1996 |
| JP | H111129873 A | 5/1999 |
| JP | 2004 243 840 A | 9/2004 |
| JP | 2005 225 407 A | 8/2005 |
| JP | 2008 094 250 A | 4/2008 |
| WO | 03/031241 A1 | 4/2003 |
| WO | WO-03031241 A1 * | 4/2003 .............. B60S 3/063 |

OTHER PUBLICATIONS

English translation of International Preliminary Report on Patentability for PCT/EP2015/068789 filed Aug. 14, 2015.
English translation of International Search Report dated Oct. 13, 2015 for PCT/EP2015/068789.
Written Opinion for PCT/EP2015/068789 filed Aug. 14, 2015.
English translation of International Preliminary Report on Patentability dated Feb. 3, 2017 for PCT/EP2015/068789 filed Aug. 14, 2015.
Opposition Request against EP 3186115 (also claiming priority to DE201410112388 and PCT/EP2015/068789) filed by Alfred Kärcher SE & Co. KG and Otto Christ AG, Jul. 24, 2019 256 pages
Reply to Opposition Request against EP 3186115 filed by WashTec Holding GmbH, Dec. 30, 2019 85 pages.
Protocol for the acceptance of the washing technology— Acceptance Report Karcher Engine Wasjomg System Lokwaschanlage RBL6000 dated Sep. 11, 1995, 1 page.
Test Report TUV Bavaria Saxony for Kärcher Engine Washing System RBL6000 dated Dec. 7, 1995, 7 pages.
Screen captures from YouTube video clip entitled "Raymond Salvetat and Torunn Siegler von WashTec", 1 page, posted May 19, 2015 by tankstelle. retrieved from Internet: < https://www.youtube.com/watch?v=JenBnuKFrSQ >.
Snapshots from Video purported from public demonstration of WashTec Multiflexsystem at Automechanika 2014 Show dated Sep. 17, 2014, 3 pages.
Screenshot www.bremer-kock.com/produktentwicklung dated Jul. 18, 2019, 1 page.
Press Release Washtec Tankstelle and Mittelstand, dated May 6, 2015, 3 pages.
Press Release Washtec Automechanika, 2014, 3 pages.
Sales Offer Karcher engine washing system RBL6000, Jun. 15, 1994, 13 pages.
Online article from autoservicepraxis de Automechanika Oct. 2014, 2 pages.
Photographs from Automechanika Sep. 2014, 2 pages.
Press Release, Jensen Media, Automechanika, Oct. 21, 2014, 5 pages.
Drawings Spare Parts list attachment to test report TÜV Bavaria Saxony, Aug. 17, 1995, 7 pages.
Kärcher Brochure Locomotive and Train Washing Systems from Library TU Moscow, published 1999, 8 pages.
Kärcher Brochure Locomotive and Train Washing Systems, published 1996, 8 pages.
Manual Karcher engine washing system RBL6000, Sep. 1995, 86 pages.

\* cited by examiner

VEHICLE WASHING INSTALLATION AND METHOD FOR THE OPERATION THEREOF

FIELD OF THE INVENTION

The invention relates to a vehicle washing installation and to a method for the operation of such a vehicle washing installation.

BACKGROUND OF THE INVENTION

A known problem during the washing of vehicles, in particular cars, in vehicle washing installations is to satisfactorily clean the frequently greatly inclined and curved side surfaces. This problem has first of all been solved by the fact that the vertically hanging, rotatable side washing brushes provided for this purpose have been suspended in a freely oscillating manner.

For example, DE 1 936 889 discloses a device for washing the side surfaces of a vehicle with side washing brushes suspended cardanically at the upper end of the washing brush axis in a manner oscillating freely to all sides. When the washing brush is brought up to the vehicle, the side washing brush can therefore nestle against the inclined side surfaces of the vehicle and clean said side surfaces. A disadvantage here is that the washing brush presses with its weight against the side surfaces, which undesirably heavily loads side surfaces that have a more pronounced inclination.

In order to reduce this resting of the washing brushes against the side surfaces, it is known from the prior art to incline the rotation axes of the side washing brushes actively transversely with respect to the longitudinal direction and to hold them in the inclined position in order to minimize the forces produced by the weight of the side washing brush against the side surfaces. Solutions of this type are known from DE 298 14 758 U1, DE 196 20 684 B4, JP 08-332 921 A and JP 03 079 455 A.

However, these embodiments have the disadvantage that they are suitable exclusively for adapting the side brushes to inclined side surfaces. To an increasing degree, however, specifically in the case of vehicles with a fastback, the side surfaces and the rear surfaces have an ever greater inclination. With the known devices, the side surfaces are indeed adequately cleaned by the inclined side washing brushes, and the oblique rear surfaces can be cleaned by the horizontal roof washing brush which runs transversely with respect to the longitudinal direction. However, the cleaning result is unsatisfactory specifically in the transition regions of the oblique rear surface to the oblique side surfaces.

In order to improve this, DE 10 2007 056 701 B3 proposes attaching an individual washing brush to a long extension arm which is pivotable over the vehicle in a horizontal plane. At the free end of the extension arm, a hanging washing brush is then suspended in a manner oscillating freely at an angle of 30° to 60° on a joint arrangement. By this means, although the oblique transition regions are readily cleaned, there is also the problem here that, in the case of more pronounced inclinations, the washing brush presses with its weight against the vehicle side and rear surfaces. Furthermore, with this free suspension, the washing brush begins to slightly swing and then executes undesired pivoting movements which cause a deterioration in the cleaning result and additionally load the vehicle. In order to prevent this, the pivoting movement can be provided by dampers for the joint connection and/or the washing brush.

A corresponding configuration is disclosed by U.S. Pat. No. 5,715,558 with washing brushes suspended in a freely oscillating manner at free ends of two pivot arms. The pivoting movement is also damped there by dampers, and therefore the rotating washing brushes cannot pivot wildly to and fro when they are brought up to the vehicle.

These embodiments are complicated in design, and the pivot arm and its pivot joints have to be of very sturdy design in order to be able to absorb the high forces occurring because of the rotation and pivoting movement of the washing brush.

SUMMARY OF THE INVENTION

A vehicle washing installation and a method for the operation thereof are therefore disclosed that permit a satisfactory washing result even of obliquely inclined side surfaces and rear surfaces of the vehicle, in particular also of the transitions of side surfaces and rear surfaces, the "C pillar".

Advantageous refinements and expedient developments of the invention are also disclosed.

A vehicle washing installation mentioned at the beginning is characterized according to the invention in that the suspension has a second actuating drive for pivoting the side washing brush about the second pivot axis. By this means, the inclination of the side washing brush can advantageously also be adapted to the vehicle surfaces which are inclined in the longitudinal direction, and, in interaction with the inclination in the transverse direction, even transition regions merging into one another between vehicle surfaces inclined transversely and longitudinally with respect to the longitudinal direction can be readily cleaned. In addition, in the case of greatly inclined surfaces, the weight of the brushes can be cushioned by the actuating drives, and therefore the washing brushes do not rest too heavily on said vehicle surfaces.

Preferably, the first pivot axis can run in a longitudinal direction of the vehicle washing installation, and/or the second pivot axis can run in a transverse direction running transversely with respect to the longitudinal direction of the vehicle washing installation. Furthermore, in an advantageous development, the first pivot axis and the second pivot axis can run at right angles to each other. Preferably, the first pivot axis and the second pivot axis can also deviate from an exact parallel or right angled course with respect to the longitudinal direction with a range of up to 20°, preferably up to 10° and particularly preferably up to a few degrees. The first and second pivot axis can advantageously also run at an angular range with respect to each other that differs from an exact right angled course by up to 20°, preferably up to 10° and particularly preferably up to a few degrees.

The first actuating drive and/or the second actuating drive can advantageously be linear drives, for example two position cylinders or any adjustable multiposition cylinders or electric linear drives.

In an advantageous embodiment in terms of production, the suspension can have a first bearing support which is mounted on a second bearing support so as to be rotatable about one of the pivot axes, and/or the second bearing support is mounted on the crossmember so as to be rotatable about the other pivot axis. In this case, preferably one of the actuating drives can act between the first bearing support and second bearing support, and the other actuating drive can act between the second bearing support and the crossmember. The actuating drives can optionally also be combined to form a common actuating drive which can bring about the rotation about the two pivot axes.

The suspension can advantageously be arranged on a carriage which is movable on a crossmember transversely with respect to a longitudinal direction of the vehicle washing installation. The vehicle washing installation can advantageously be a gantry washing installation in which the side washing brushes are arranged on a movable washing gantry, or a car wash in which the side washing brushes are arranged on a stationary, gantry-shaped frame.

Preferably, an inclination sensor can be provided for detecting the inclination of the side washing brush about the first pivot axis and/or an inclination sensor can be provided for detecting the inclination of the side washing brush about the second pivot axis. By this means, a very precise sensing of the inclination of the relevant pivot axis and side washing brush can be carried out.

The first pivot axis and the second pivot axis can preferably run substantially horizontally. By this means, the mounting of the washing brush can be further simplified while providing sufficient stability. Furthermore, the side washing brush can be arranged hanging freely downward, as a result of which the movability of the washing brush can be further improved.

A method for operating a vehicle washing installation, in particular as described above and below, with at least one side washing brush which is mounted on the vehicle washing installation so as to be rotatable about a first pivot axis and a second pivot axis which differs therefrom and runs transversely with respect to a longitudinal direction of the vehicle washing installation, wherein an actuating drive is provided for pivoting the side washing brush about the second pivot axis, has, according to the invention, the following steps: a) detecting and/or determining the inclination of a first vehicle surface running transversely with respect to the longitudinal direction, b) pivoting the side washing brush out of a basic position about the second pivot axis corresponding to the inclination of the first vehicle surface, and c) moving the side washing brush along the first vehicle surface to clean the first vehicle surface.

Advantageously, the inclination of at least one second vehicle surface adjoining the first vehicle surface can be detected, and the side washing brush can be pivoted about the first pivot axis corresponding to the inclination of the second vehicle surface by means of a further actuating drive if, in step c), a transition region between the first vehicle surface and the second vehicle surface is reached. The pivoting of the side washing brush about the first pivot axis can advantageously be blocked here during step c) in order to reduce excessive oscillation of the side washing brush in the transverse direction. For washing the second vehicle surface, the side washing brush can preferably be pivoted back into the basic position and can be blocked there against pivoting about the second pivot axis, and therefore excessive oscillation in the longitudinal direction is avoided.

BRIEF DESCRIPTION OF THE DRAWINGS

Further special characteristics and preferences of the invention emerge from the detailed description below of preferred exemplary embodiments with reference to the drawings, in which.

DETAILED DESCRIPTION OF THE INVENTION

Figure 1:
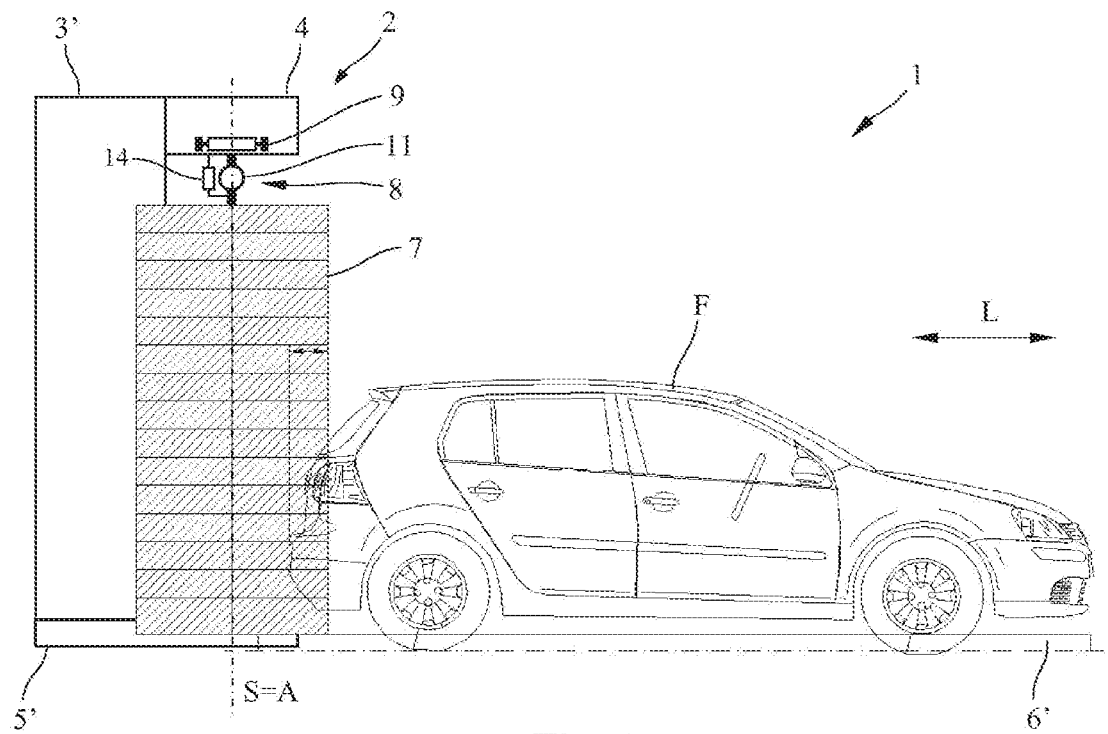
FIG. 1 shows a schematic side view of a vehicle washing installation according to the invention in a first position.

FIGS. 1 to 5 show a vehicle washing installation according to the invention in the form of a schematically illustrated gantry washing installation 1 with a washing gantry 2. The washing gantry 2 has two gantry columns 3, 3' which are substantially vertical and are connected to each other by a gantry crossmember 4. Provided at the lower end of the gantry columns 3, 3' are travel bases 5, 5' with which the washing gantry is movable in a longitudinal direction L of the washing installation 1 on travel rails 6, 6'. Vertical side washing brushes 7, 7', also referred to below simply only as washing brushes 7, 7', and a horizontal roof washing brush (not shown) are arranged on the washing gantry 2. This design of the gantry washing installation 1 is known per se and therefore does not require any further explanation.

Since the gantry washing installation 1 is of symmetrical design with respect to its longitudinal center axis running in the longitudinal direction L, the invention is explained below especially with reference to the right side in FIGS. 3 to 5, and corresponding explanations also correspondingly apply to the left side. Therefore, for the components of the left side, use is made of the reference signs of the corresponding components of the right side, said reference signs being provided with an apostrophe. For better explanation of the invention, FIGS. 1 and 2 only show the left part of the washing gantry 2 in FIGS. 3 to 5 together with the right washing brush 7.

Figure 2:
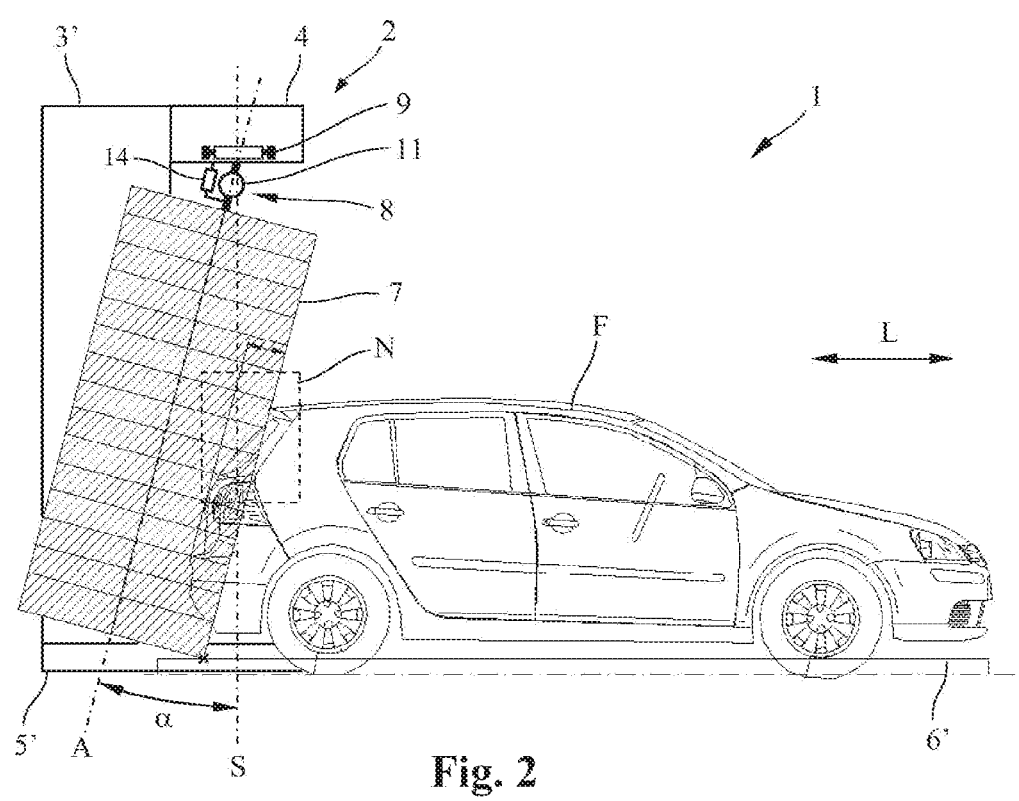
FIG. 2 shows the side view of the vehicle washing installation from FIG. 1 in a second position.
Figure 6:
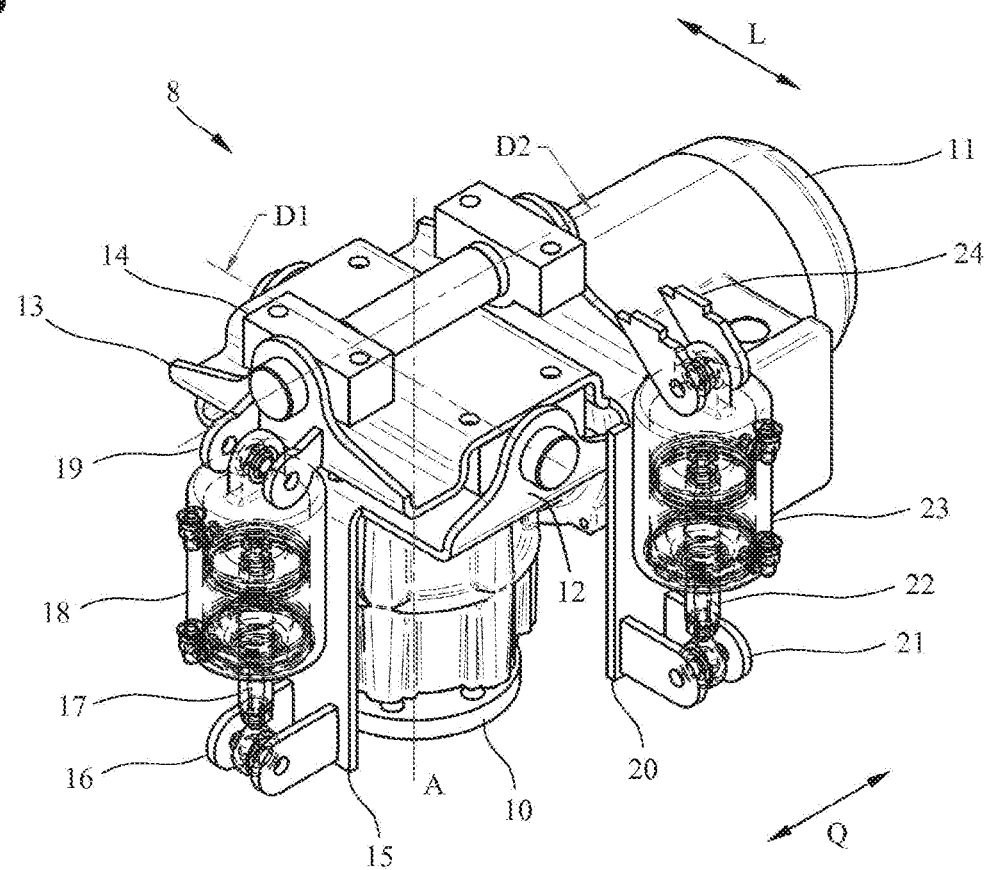
FIG. 6 shows a schematic three-dimensional view of a side washing brush suspension of the vehicle washing installation from FIG. 1.

According to the invention, the washing brush 7 is suspended here on a carriage 9, indicated schematically in FIGS. 1 and 2, via a suspension 8, which is indicated in FIGS. 1 and 2 and is shown in detail in FIG. 6. The carriage 9 is movable in a transverse direction Q running transversely with respect to the longitudinal direction L on the gantry crossmember 4.

The washing brush 7 is arranged on a brush holder 10 of the suspension. The brush holder 10 can be rotated together with the washing brush 7 about a rotation axis A of the washing brush 7 by a drive motor 11 via a gearing (not shown). Before the beginning of the cleaning, the rotation axis A and therefore the washing brush 7 are in the vertical undeflected basic position S shown in FIG. 1.

The brush holder 10 and the drive motor 11 are arranged for this purpose on a first bearing support 12 which, for its part, is arranged on a second bearing support about a horizontal first pivot axis D1 running in the longitudinal direction L. The second bearing support 13 is for its part arranged on the travel carriage 9 via bearing blocks 14 about a horizontal second pivot axis D2 running in the transverse direction Q. The washing brush 7 is therefore mounted in a freely oscillating manner in the longitudinal direction L and transverse direction Q similarly to a cardan joint.

In order to be able to actively adapt the inclination of the washing brush 7 to the transition between oblique side surfaces FS and an oblique rear surface FH of a vehicle F, the first bearing support 12 has a bearing web 15 protruding substantially at right angles. At its front end, the first bearing web 15 has bearing flanges 16 for the rotatable fastening of a piston rod 17 of a first actuating cylinder 18. The first actuating cylinder 18 itself is mounted rotatably on the second bearing support 13 via bearing flanges 19. By means of the first actuating cylinder 18, the first bearing support 12 and consequently also the washing brush 7 can be positioned obliquely in the transverse direction Q about the first pivot axis D1.

In order to be able to actively pivot the washing brush 7 by an angle of inclination α about the second pivot axis D2 in the longitudinal direction L, the second bearing support 13 likewise has a second bearing web 20 protruding substantially at right angles therefrom. At its free end, the bearing web 20 bears bearing flanges to which a piston rod 22 of a second actuating cylinder 23 is rotatably coupled. The second actuating cylinder 23 for its part is coupled rotatably to the travel carriage 9 via bearing flanges 24. With the second actuating cylinder 23, the second bearing support 13, and consequently the washing brush 7, can therefore be pivoted in the longitudinal direction L about the pivot axis D2. The washing brush 7 can be inclined here forward and back in the longitudinal direction L. In a simpler embodiment, the inclination can optionally also take place only in the direction shown in FIG. 2.

The actuating cylinders 18 and 23 are preferably pneumatic or hydraulic cylinders which can act at least in one direction in order to position the rotation axis A of the washing brush 7 from the hanging vertical position S shown in FIG. 1 into the desired oblique position, as shown in FIG. 2. The movement back from the inclined position can take place in a manner brought about by gravity with such single action cylinders. For the more rapid and defined adjustment of the inclination of the washing brush, double action cylinders can optionally also be used. Other drives can optionally also be provided in order to pivot the washing brush 7, for example electric linear drives.

The washing brush 7 can therefore be adapted both to the obliquely inclined rear surface FH and to the obliquely inclined side surface FS of the vehicle, wherein, by this means, the greatly inclined transition surfaces between the rear surface FH and side surface FS can then also be readily reached.

The degree of inclination of the side surfaces FS, FS' and the rear surface FH can be determined by a contour sensing which is known per se and is undertaken prior to or during a first crossing of the washing gantry 2 over the vehicle F in order to be able to correspondingly activate the actuating cylinders 18, 23. The contour sensing can be undertaken here inter alia by means of light barriers, image processing means, etc. The inclination of the rear surface FH can also be determined, for example, by the transitions between the roof surface and rear surface FH and rear surface FH and the end of the vehicle and also the associated heights of the roof washing brush being correlated with one another with the washing of the vehicle F with the roof washing brush. In a corresponding manner, the inclination of the side surfaces FS, FS' can be determined during the cleaning with the washing brushes 7, 7', beginning at the front of the vehicle F.

In an advantageous development of the invention, the inclinations of the side surfaces FS, FS' and of the rear surface FH can also be identified by angle sensors which sense the deflection of the rotation axis A of the washing brush 7 out of its basic position about the pivot axes D1 and D2. Preferably, an angle sensor can be provided here between the first bearing support 12 and the second bearing support 13 for determining the inclination about the pivot axis D1, and a further angle sensor can be provided between the second bearing support 13 and the travel carriage 9 for determining the inclination about the pivot axis D2.

The corresponding values can then be stored in a manner known per se in the control system of the gantry washing installation 1 and used for controlling the latter.

The active pivoting of the washing brushes 7, 7' by means of the suspension 8 is explained below with reference to FIGS. 1 to 5. To the extent possible, this is undertaken especially with reference to the right washing brush 7, and corresponding explanations also apply to the left washing brush 7'.

Figure 3:
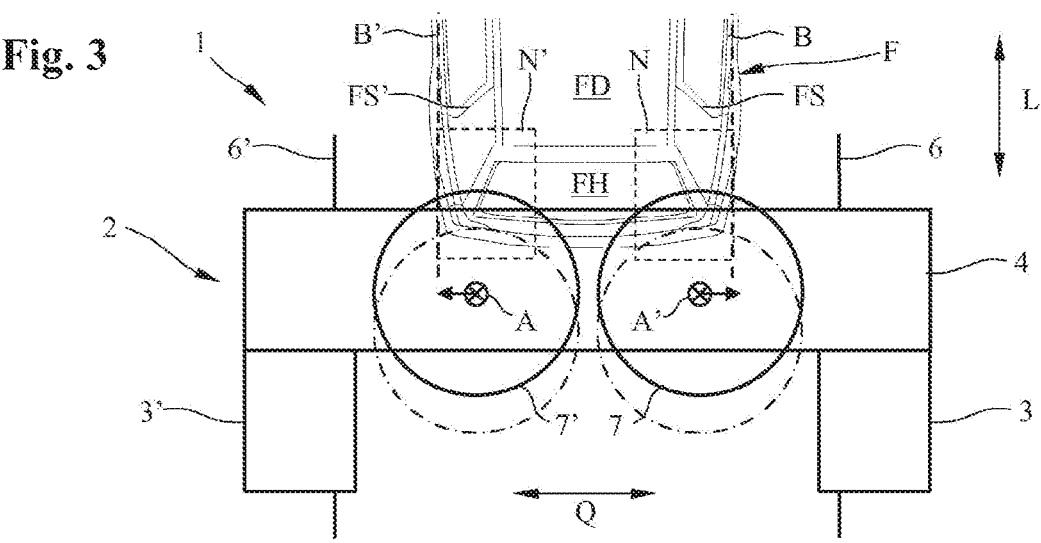
FIG. 3 shows a schematic top view of the vehicle washing installation from FIG. 1 in the first position.

Before the position of the washing brushes 7, 7' that is shown in FIG. 3, the roof surface FD and the rear surface FH of the vehicle F have already been cleaned with the roof washing brush (not shown), and the side surfaces FS, FS', beginning at the front of the vehicle F, and then the washing brushes 7, 7' have been moved around the rear of the vehicle into the central starting position shown in FIG. 3.

From the central starting position in FIG. 3, the washing brushes 7, 7' then first of all clean the rear surfaces FH of the vehicle F, beginning from the center of the vehicle toward the side surfaces FS, FS' of the vehicle F. The washing brushes 7, 7' are actively pivoted here by the actuating cylinder 23 in the longitudinal direction L, i.e. by approx. 15° about the pivot axis D2, about the pivot axis D2 in order to be able to neatly wash the correspondingly obliquely inclined rear surface FH. The oblique position of the rotation axis A is indicated in FIGS. 3 to 5 by the chain-dotted lines which show the position of the lower ends of the washing brushes 7, 7', while the position of the upper ends of the washing brushes 7, 7' is indicated by the solid lines.

By contrast, the washing brush 7 is held vertically in the transverse direction Q, i.e. the rotation axis A of the washing brush 7 is secured by the first cylinder 18.

As soon as it is established with reference to the contour sensing data that the washing brushes 7, 7' are entering the region of the inclined side surfaces FS, FS' of the vehicle F, the washing brushes 7, 7' are pivoted outward in the transverse direction Q. This is indicated in FIG. 4 by the fact that the rotation axes A, A' of the washing brushes 7, 7' outwardly exceed imaginary boundary lines B, B' determined in the control system from the contour data. The angle of inclination of the rotation axis A in the transverse direction Q preferably corresponds here to the inclination of the side surfaces FS, FS' in the region of the C pillar, and therefore said oblique transition regions N, N' are readily cleaned. The angle of inclination in the transverse direction Q is around 5° here.

The rotation axis A is preferably not abruptly pivoted here but rather realized in a manner adapted to the contour of the vehicle F. For this purpose, the vehicle data determined by the contour sensing can be used in order to adapt the angle of inclination as readily as possible and preferably continuously in both directions to the inclination of the rear surface FH and the side surfaces FH, FS, FS'. For this purpose, the actuating cylinders 18, 23 are preferably designed as multiposition cylinders, and therefore each angle of inclination is adjustable. Adapting here does not mean that the angle of inclination of the rotation axes A, A' of the washing brushes 7, 7' precisely corresponds to the angles of inclination of the side surfaces FS, FS' or of the rear surface FH, but rather that an approximate adaptation with a certain tolerance takes place since the transition regions N, N' frequently do not have any angles remaining the same over the entire height of the vehicle.

Figure 4:
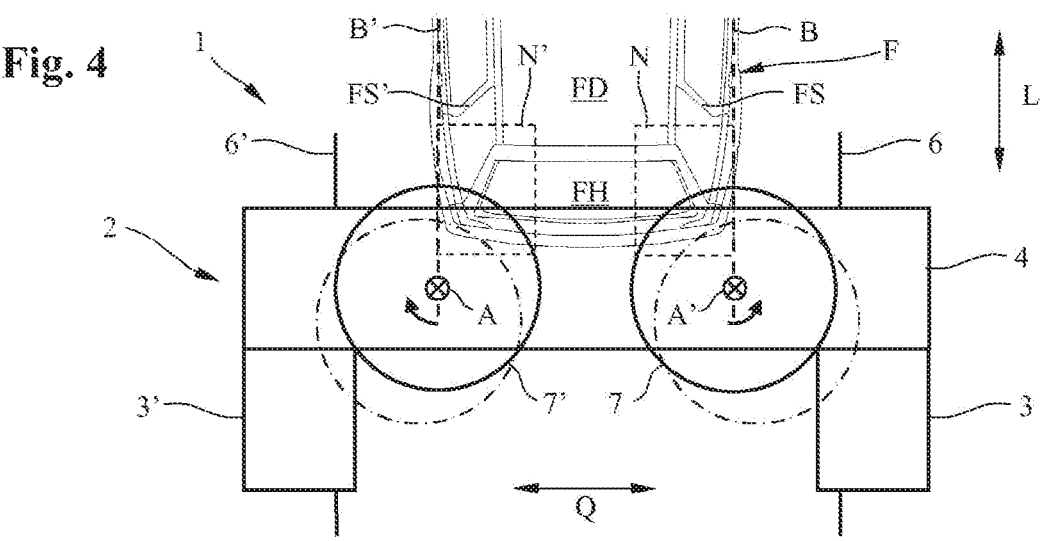
FIG. 4 shows the top view from FIG. 3 with the vehicle washing installation in the second position from FIG. 2.

As indicated in FIG. 4 by the curved arrows, the washing brushes 7, 7' move along a path along the transition regions N, N' between the rear surface FH and the side surfaces FS, FS'.

Figure 5:
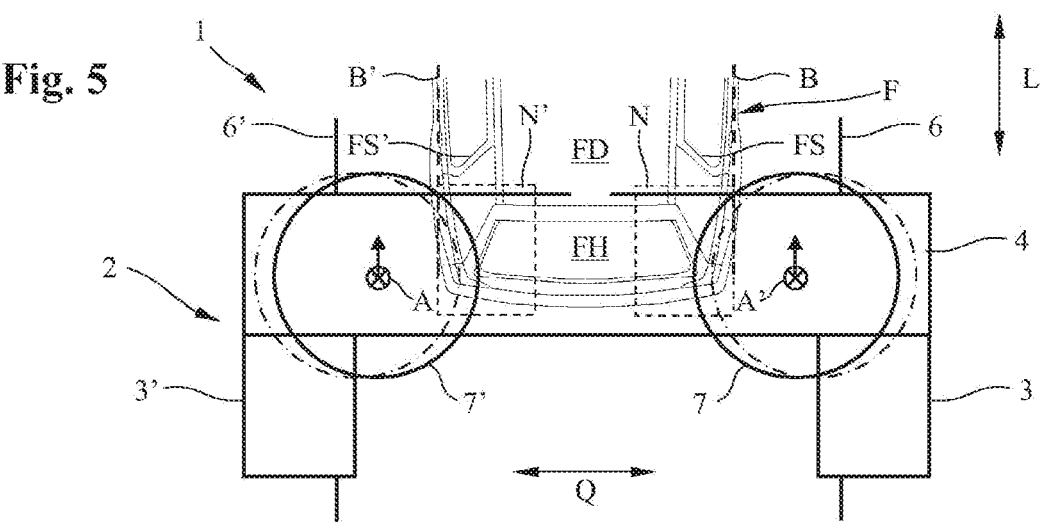
FIG. 5 shows the top view from FIG. 3 with the vehicle washing installation in a third position.

If the rear surface FH including the transition regions N, N' between the rear surface FH and the side surfaces FS, FS' has been cleaned, the washing brushes 7, 7' are pivoted back in the longitudinal direction L into their basic position S and therefore hang vertically downward, as shown in FIG. 5. The washing brushes 7, 7' remain inclined in an unchanged manner in the transverse direction in order to be able to clean the oblique side surfaces FS, FS' when they next cross over the vehicle F.

The method described above is expedient especially in vehicles F having a pronounced inclination of the side surfaces FS, FS', in order to avoid the weight of the washing brushes 7, 7' acting on the side surface FS, FS' if the washing brushes 7, 7' were freely movable in the transverse direction Q.

In an advantageous alternative embodiment, during the transition from the position shown in FIG. 3 to the position shown in FIG. 4 with the washing brush 7, 7' actively pivoted in the longitudinal direction L, the washing brushes 7, 7' cannot be actively pivoted in the transverse direction Q by the actuating cylinder 18, but rather the actuating cylinder 18 is enabled such that the washing brushes 7, 7' can freely oscillate in the transverse direction Q. This takes place again as soon as the washing brushes 7, 7' reach the previously determined region of the vehicle sides FS or FS' when moving in the transverse direction Q, i.e. when the rotation axes A, A' outwardly exceed the boundary lines B, B'. As a result, the inclination of the rotation axis A can be adapted to the inclination of the side surfaces FS, FS' in the transition regions N, N' of the C pillar, and therefore the washing brushes 7, 7' readily nest against these transition regions, which have a double inclination, and clean said transition regions. The angle of inclination in the transverse direction Q is approx. 3° to 8° here. The washing brushes 7, 7' then no longer move further outward than up to the lateral extent of the vehicle sides FS or FS' determined previously via the contour sensing.

This is expedient in the case of vehicles F with a more shallow inclination of the side surfaces FS, FS' since the washing brushes 7, 7' are very steep here in the transverse direction Q and therefore only a relatively low weight acts on the side surfaces FS, FS'. If, however, the inclination of the side surfaces FS, FS' exceeds a predetermined value, for example 10°, the washing brushes 7, 7' are automatically set in the inclined position by the first actuating cylinder 18 at an appropriate angle in order to take the weight from the side surfaces FS, FS'.

In an alternative embodiment, one or else both actuating drives 18, 23 can also be designed only as a two position cylinder, wherein then no as true to angle as possible and optionally continuously adapting inclination of the rotation axes A, A' of the washing brushes 7, 7' is set, but rather either the basic position or the inclination predetermined by the two position cylinder, for example 15°, is set.

By this means, firstly, costs for the actuating drives and the contour sensing can be reduced and, secondly, the outlay on control technology can be reduced. This is because the angle of inclination of the rotation axes A, A' then does not have to be constantly tracked, optionally about the two pivot axes D1, D2, but rather, when the transition regions N, N' are reached or at the beginning of the inclination of the side surfaces FS, FS' or of the rear surface FH, the rotation axis A, A' is brought into the single inclined position by the respective actuating drive 18, 23. Of course, this simplification is also possible with the above-described multiposition cylinders. With said multi-position cylinders, it is advantageously possible, for example, also to realize only three positions (basic position, slightly inclined and greatly inclined) in order likewise to reduce the outlay on control technology.

LIST OF REFERENCE SIGNS

1 Gantry washing installation (vehicle treatment installation)
2 Washing gantry
3, 3' Gantry columns
4 Gantry crossmember
5, 5' Travel bases
6, 6' Travel rails
7, 7' Side washing brushes
8 Side washing brush suspension
9 Travel carriage
10 Brush holder
11 Washing brush drive motor
12 First bearing support
13 Second bearing support
14 Bearing blocks
15 First bearing web
16 Bearing flanges
17 First cylinder piston rod
18 First actuating cylinder
19 Bearing flanges
20 Second bearing web
21 Bearing flanges
22 Second cylinder piston rod
23 Second actuating cylinder
24 Bearing flanges
A, A' Washing brush rotation axis
S Position of the freely hanging washing brush rotation axis
B, B' Lateral boundary lines
D Suspension rotation axis in the transverse direction
D2 Suspension rotation axis in the longitudinal direction
F Vehicle
FD Vehicle roof surface
FH Vehicle rear surface
FS, FS' Vehicle side surfaces
N, N' Transition regions of the vehicle rear
L Longitudinal direction of the gantry washing installation
Q Transverse direction
α Angle of inclination in the longitudinal direction

The invention claimed is:

1. A vehicle washing installation with at least one side washing brush which is mounted on a crossmember of the vehicle washing installation by a suspension so as to be rotatable about a first pivot axis and a second pivot axis which differs therefrom, wherein the suspension has a first actuating drive for pivoting the at least one side washing brush about the first pivot axis and a second actuating drive for pivoting the at least one side washing brush about the second pivot axis, wherein the suspension has a first bearing support which is mounted on a second bearing support so as to be rotatable about one of the pivot axes, and the second bearing support is mounted on the crossmember so as to be rotatable about the other pivot axis, and wherein the suspension is arranged on a carriage which is movable on the crossmember transversely with respect to a longitudinal direction of the vehicle washing installation.

2. The vehicle washing installation of claim 1, wherein the first pivot axis runs in the longitudinal direction of the vehicle washing installation.

3. The vehicle washing installation of claim 1, wherein the second pivot axis runs in a transverse direction running transversely with respect to the longitudinal direction of the vehicle washing installation.

4. The vehicle washing installation of claim 1, wherein the first pivot axis and the second pivot axis run at right angles to each other.

5. The vehicle washing installation of claim 1, wherein at least one of the first actuating drive and the second actuating drive is a linear drive.

6. The vehicle washing installation of claim 1, wherein one of the actuating drives acts between the first bearing support and the second bearing support and the other actuating drive acts between the second bearing support and the crossmember.

7. A vehicle washing installation with at least one side washing brush which is mounted on a crossmember of the vehicle washing installation by a suspension so as to be rotatable about a first pivot axis and a second pivot axis which differs therefrom, wherein the suspension has a first actuating drive for pivoting the at least one side washing brush about the first pivot axis and a second actuating drive for pivoting the at least one side washing brush about the second pivot axis, wherein the suspension has a first bearing support which is mounted on a second bearing support so as to be rotatable about one of the pivot axes, and the second bearing support is mounted on the crossmember so as to be rotatable about the other pivot axis, wherein an inclination sensor is provided for detecting an inclination of the at least one side washing brush about the first pivot axis and/or an inclination sensor is provided for detecting an inclination of the at least one side washing brush about the second pivot axis.

8. The vehicle washing installation of claim 1, wherein the first pivot axis and the second pivot axis run substantially horizontally.

9. The vehicle washing installation of claim 1, wherein the at least one side washing brush is arranged hanging freely downward.

10. A method for operation of a vehicle washing installation with at least one side washing brush which is mounted on a crossmember of the vehicle washing installation by a suspension so as to be rotatable about a first pivot axis and a second pivot axis which differs therefrom, wherein the suspension has a first actuating drive for pivoting the at least one side washing brush about the first pivot axis and a second actuating drive for pivoting the at least one side washing brush about the second pivot axis, wherein the suspension has a first bearing support which is mounted on a second bearing support so as to be rotatable about one of the pivot axes, and the second bearing support is mounted on the crossmember so as to be rotatable about the other pivot axis, the method comprising:

a) detecting and/or determining an inclination of a first vehicle surface running transversely with respect to the longitudinal direction, b) pivoting the at least one side washing brush out of a basic position about the second pivot axis corresponding to the inclination of the first vehicle surface, c) moving the at least one side washing brush along the first vehicle surface to clean the first vehicle surface, d) detecting an inclination of at least one second vehicle surface adjoining the first vehicle surface, e) pivoting the at least one side washing brush about the first pivot axis corresponding to the inclination of the second vehicle surface if, in step c), a transition region between the first vehicle surface and the at least one second vehicle surface is reached.

11. The method of claim 10, wherein the pivoting of the at least one side washing brush about the first pivot axis is blocked during step c).

12. The method of claim 10, wherein for washing the at least one second vehicle surface, the at least one side washing brush is pivoted back into the basic position and is blocked there against pivoting about the second pivot axis.

13. The method of claim 10, wherein the first pivot axis and the second pivot axis run substantially horizontally.

14. The method of claim 10, wherein at least one of the first actuating drive and the second actuating drive of the vehicle washing installation is a linear drive.

15. The vehicle washing installation of claim 7, wherein the first pivot axis and the second pivot axis run at right angles to each other.

16. The vehicle washing installation of claim 7, wherein at least one of the first actuating drive and the second actuating drive is a linear drive.

17. The vehicle washing installation of claim 7, wherein one of the actuating drives acts between the first bearing support and the second bearing support and the other actuating drive acts between the second bearing support and the crossmember.

18. The vehicle washing installation of claim 7, wherein the first pivot axis and the second pivot axis run substantially horizontally.

19. The vehicle washing installation of claim 1, wherein the at least one side washing brush is arranged hanging freely downward.

* * * * *